(12) United States Patent
Walker, Jr. et al.

(10) Patent No.: US 7,255,484 B2
(45) Date of Patent: Aug. 14, 2007

(54) METHOD AND SYSTEM FOR RELEASING A PLUGGABLE MODULE

(75) Inventors: Harold Y. Walker, Jr., Plano, TX (US); Richard L. Bell, Richardson, TX (US)

(73) Assignee: Finisar Corporation, Sunnyvale, CA (US)

( * ) Notice: Subject to any disclaimer, the term of this patent is extended or adjusted under 35 U.S.C. 154(b) by 203 days.

(21) Appl. No.: 10/006,103

(22) Filed: Dec. 6, 2001

(65) Prior Publication Data

US 2003/0108300 A1    Jun. 12, 2003

(51) Int. Cl.
*G02B 6/36* (2006.01)
*G02B 6/00* (2006.01)

(52) U.S. Cl. ............................. 385/53; 385/88; 385/92

(58) Field of Classification Search .............. 385/88–89, 385/92, 134, 139, 147; 361/728, 747, 752, 361/754, 755

See application file for complete search history.

(56) References Cited

U.S. PATENT DOCUMENTS

| | | | |
|---|---|---|---|
| 4,083,619 A | 4/1978 | McCormick et al. |
| 4,387,956 A | 6/1983 | Cline |
| 4,678,264 A | 7/1987 | Bowen et al. |
| 4,798,430 A | 1/1989 | Johnson et al. |
| 4,993,803 A | 2/1991 | Suverison et al. |
| 5,039,194 A | 8/1991 | Block et al. |
| 5,069,522 A | 12/1991 | Block et al. |
| 5,071,219 A | 12/1991 | Yurtin et al. |
| 5,195,897 A | 3/1993 | Kent et al. |
| 5,202,943 A | 4/1993 | Carden et al. |
| 5,256,080 A | 10/1993 | Bright |
| 5,329,428 A | 7/1994 | Block et al. |
| 5,416,871 A | 5/1995 | Takahaski et al. |
| 5,487,678 A | 1/1996 | Tsuji et al. |
| 5,528,408 A | 6/1996 | McGinley et al. |
| 5,546,281 A | 8/1996 | Poplawski et al. |
| 5,561,727 A | 10/1996 | Akita et al. |

(Continued)

FOREIGN PATENT DOCUMENTS

DE      20005316 U      3/2000

(Continued)

OTHER PUBLICATIONS

International Search Report, dated May 22, 2003, relative to PCT application No. PCT/US 02/38728, the foreign equivalent to the instant U.S. Appl. No. 10/006,103.

(Continued)

*Primary Examiner*—Sung Pak
(74) *Attorney, Agent, or Firm*—Workman Nydegger

(57) ABSTRACT

A method and system is disclosed for locking and releasing a module utilized in a transceiver system that includes a plurality of modules in close proximity with one another. The module is generally configured to include a handle with an associated cam formed in a first section of the module. The handle is moveable in a direction to allow the cam to move an associated ejector button integrated with the module in order to release the module from the transceiver system, thereby permitting the module to be efficiently removed from the transceiver system. The module may thus be removed from the transceiver system utilizing the handle. The module may be locked into the transceiver system when the handle is placed in an upward position.

15 Claims, 5 Drawing Sheets

U.S. PATENT DOCUMENTS

| | | | |
|---|---|---|---|
| 5,596,665 A | 1/1997 | Kurashima et al. | |
| 5,734,558 A | 3/1998 | Poplawski et al. | 361/752 |
| 5,738,538 A | 4/1998 | Bruch et al. | |
| 5,767,999 A | 6/1998 | Kayner | 359/163 |
| 5,820,398 A | 10/1998 | Stabroth et al. | |
| 5,879,173 A | 3/1999 | Poplawski et al. | 438/138 |
| 5,901,263 A | 5/1999 | Gaio et al. | |
| 5,931,290 A | 8/1999 | Wehrli, III et al. | |
| 5,947,435 A | 9/1999 | Small | |
| 5,980,324 A | 11/1999 | Berg et al. | |
| 6,050,658 A | 4/2000 | O'Sullivan et al. | |
| 6,069,991 A | 5/2000 | Hibbs-Brenner et al. | 385/50 |
| 6,074,228 A | 6/2000 | Berg et al. | |
| 6,081,431 A * | 6/2000 | Lemke | 361/800 |
| 6,088,498 A | 7/2000 | Hibbs-Brenner et al. | 385/52 |
| 6,142,802 A | 11/2000 | Berg et al. | |
| 6,142,828 A | 11/2000 | Pepe | |
| 6,149,465 A | 11/2000 | Berg et al. | |
| 6,169,295 B1 | 1/2001 | Koo | 257/81 |
| 6,229,708 B1 | 5/2001 | Corbin, Jr. et al. | |
| 6,231,145 B1 | 5/2001 | Liu | |
| 6,259,769 B1 | 7/2001 | Page et al. | |
| 6,430,053 B1 | 8/2002 | Peterson et al. | |
| 6,434,015 B1 | 8/2002 | Hwang | |
| 6,439,918 B1 | 8/2002 | Togami et al. | |
| 6,494,623 B1 | 12/2002 | Ahrens et al. | |
| 6,517,382 B2 | 2/2003 | Flickinger et al. | |
| 6,524,134 B2 | 2/2003 | Flickinger et al. | |
| 6,532,155 B2 | 3/2003 | Green et al. | |
| 6,533,603 B1 * | 3/2003 | Togami | 439/372 |
| 6,538,882 B2 | 3/2003 | Branch et al. | |
| 6,544,055 B1 | 4/2003 | Branch et al. | |
| 6,544,622 B1 | 4/2003 | Engel et al. | |
| 6,556,445 B2 | 4/2003 | Medina | |
| 6,570,768 B2 | 5/2003 | Medina | |
| 6,692,159 B2 * | 2/2004 | Chiu et al. | 385/53 |
| 6,796,715 B2 * | 9/2004 | Chiu et al. | 385/53 |
| 2002/0142649 A1 | 10/2002 | Baugh et al. | |
| 2002/0150343 A1 | 10/2002 | Chiu et al. | |
| 2002/0150353 A1 | 10/2002 | Chiu et al. | |
| 2003/0020986 A1 | 1/2003 | Pang et al. | |
| 2003/0044129 A1 * | 3/2003 | Ahrens et al. | 385/92 |
| 2003/0059167 A1 | 3/2003 | Chiu et al. | |
| 2003/0100204 A1 | 5/2003 | Hwang | |

FOREIGN PATENT DOCUMENTS

| | | |
|---|---|---|
| DE | 20005316 | 9/2000 |
| EP | 0442608 B1 | 8/1991 |
| EP | 0456298 B1 | 11/1991 |
| GB | 2 297 007 A | 12/1995 |
| JP | 4-165312 | 6/1992 |

OTHER PUBLICATIONS

*Small Form Factor Transceiver Multisource Agreement*, cooperation agreement among Agilent Technologies, Blaze Network Products, E2O Communications, Inc., ExceLight Communications, Finisar Corporation, Fujkura Technology America Corp., Hitachi Cable, Infinion Technologies Corp., IBM Corp., Lucent Technologies, Molex, Inc., Optical Communication Products, Inc., Picolight, Inc., Stratos Lightwave, Tyco Electronics, Sep. 14, 2000.

Block et al., *Field Replaceable Optical Link Card*, IBM Technical Disclosure Bulletin, vol. 37, No. 02B, Feb. 1994.

Soderstrom et al., *CD Laser Optical Data links for Workstations and Midrange Computers*, Electronic Components and Technology Conference, Jun. 1993.

Block et al, *Optical Link Card Guide/Retention System*, Research Disclosure, Kenneth Mason Publications Ltd., Apr. 1993, No. 348.

Baldwin et al., *Fiber Optic Module Interface Attachment*, Research Disclosure, Kenneth Mason Publications Ltd., Oct. 1991, No. 330.

Jarvela, *Package for Electrical and Optical Components of Communications Port of Data Processing System*, IBM Technical Disclosure Bulletin, vol. 27, No. 8, Jan. 1985.

Article Titled "XFP (10 Gigabit Small Form Factor Pluggable Module)," Ghiasi et al., XFP MSA, 2002.

* cited by examiner

METHOD AND SYSTEM FOR RELEASING A PLUGGABLE MODULE

TECHNICAL FIELD

The present invention generally relates to modules for use in fiber optic and transceiver systems. The present invention also relates to pluggable modules that may be utilized in such transceiver systems. The present invention also relates to transceiver modules and methods and systems for releasing such modules from transceiver systems in which modules are mounted closely to one another.

BACKGROUND OF THE INVENTION

Optoelectronic transceiver modules provide for the bi-directional transmission of data between electrical interfaces and optical data links. Such a module generally can receive electrically encoded data signals for conversion into optical signals, which can then be transmitted over the optical data link. Likewise, such a module can receive optically encoded data signal, which can then be converted into electrical signals and transmitted onto an electrical interface.

Other types of transceiver modules can also be utilized to transmit data. Infrared transceivers, for example, can be utilized for a number of data communication applications. For example, infrared transceiver modules can be utilized to couple laptop computers and personal information managers (PIMs) to IR ports or printers. Also, an increasing number of portable and PIM systems include IR transceiver modules to provide inter-computer and inter-PIM data transfers.

An IR transceiver module typically includes an IR PIN (p-intrinsic-n) diode for a sensor, and an IR light emitting diode (LED) as an emitter. Associated with the sensor is receiver circuitry, and associated with the emitter is transmission circuitry. When the receiver circuitry and transmitter circuitry are integrated together on an integrated circuit (IC), the circuitry can be referred to as a "transceiver" IC or, simply, a "transceiver."

While the sensor, emitter and transceiver of an IR transceiver system can be provided as separate components, it is often desirable to have these components combined into a single package or "module" to save space. Such IR transceiver modules are well known and are commercially available from a number of sources. By combining the various components of the IR transceiver system into a single module, the size or "form factor" of the system can be reduced considerably. Additionally, such modules tend to be more durable and often consume less power then equivalent structures formed with the discrete components.

A transceiver module may be mounted onto one or more circuit card assemblies of a host computer, input/output system, peripheral device, or switch. Therefore, as with all electronic equipment there is a need for a transceiver module having an outer package design which occupies as little circuit card surface area as possible. One of the problems with such designs, however, is the fact that many modules are often required to be utilized in such devices and transceiver systems. In scenarios in which a variety of modules are placed in close proximity to one another, this presents additional difficulties.

Based on the foregoing, the present inventors have concluded that a need exists for a pluggable module that can be efficiently plugged into and removed from transceiver systems that require the use of a number of closely packed modules. The present invention thus meets and addresses this need.

BRIEF SUMMARY OF THE INVENTION

The following summary of the invention is provided to facilitate an understanding of some of the innovative features unique to the present invention, and is not intended to be a full description. A full appreciation of the various aspects of the invention can be gained by taking the entire specification, claims, drawings, and abstract as a whole.

It is therefore one aspect of the present invention to provide an improved transceiver module.

It is therefore another aspect of the present invention to provide an improved pluggable module for use in transceiver and other systems.

It is another aspect of the present invention to provide a method and system for releasing a module from a transceiver system that includes a plurality of modules in proximity to one another.

It is yet another aspect of the present invention to provide a pluggable module having an ejector button formed from molded plastic or other rigid material.

It is still another aspect of the present invention to provide a pluggable module having a release handle, which can be formed from wire.

The above and other aspects are achieved as is now described. A method and system is disclosed for releasing a module utilized in a transceiver system that includes a plurality of modules in close proximity with one another. The module is generally configured to include a handle with an associated cam formed in a first section of the module. The handle can be pulled in a downward (or upward) direction to allow the cam to move an associated ejector button integrated with the module in order to release the module from the transceiver system, thereby permitting the module to be efficiently removed from the transceiver system. The module is thus removable from the transceiver system utilizing the handle. The module is locked into the transceiver system when the handle is placed in an upward position. The handle itself may comprise a wire handle, which can be formed from steel wire. The ejector button may be configured from molded plastic or other rigid material. The module itself generally comprises a pluggable module, which can be plugged into and removed from the transceiver system. Such a module can comprise a small form-factor pluggable transceiver module for use in association with the transceiver system.

The method and system for removing a module, as indicated herein, thus utilizes a small wire handle with a cam formed in one section and a modified ejector button. When the handle is place in an up position, the module is locked into place. When the handle is pulled down (or opposite its lock position), the cam moves the ejector button, which releases the module. The handle can then be utilized to pull the module away from the transceiver system or other associated system into which it had previously plugged.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate embodiments of the present invention and are not intended to limit the scope of the invention.

Figure 2:
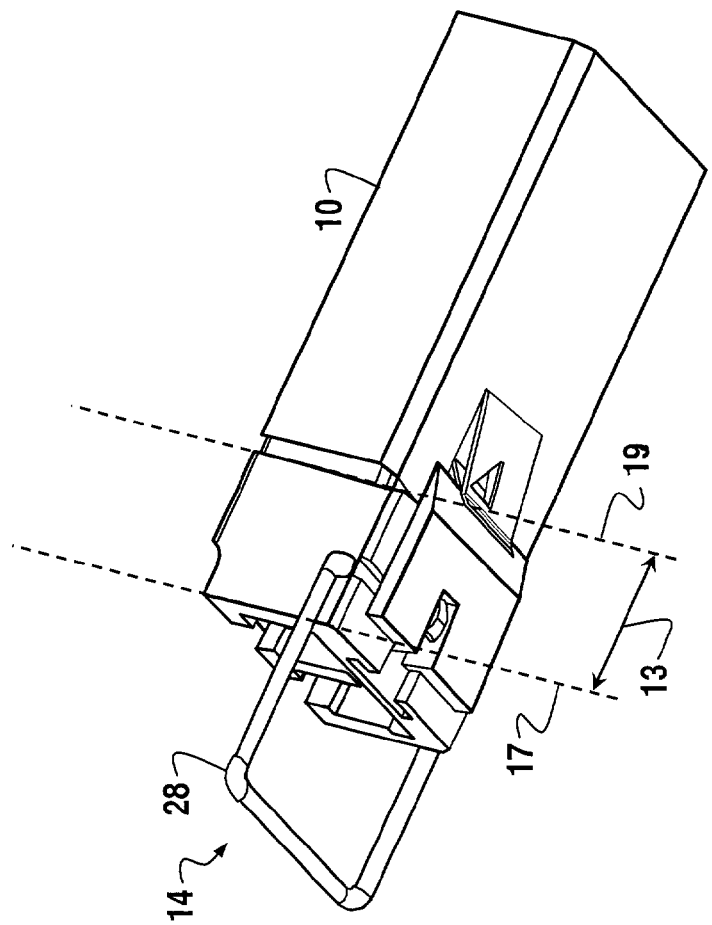
FIG. 2 illustrates a perspective pictorial view of a pluggable module having a handle thereof in a downward position, in accordance with a preferred embodiment of the present invention.
Figure 1:
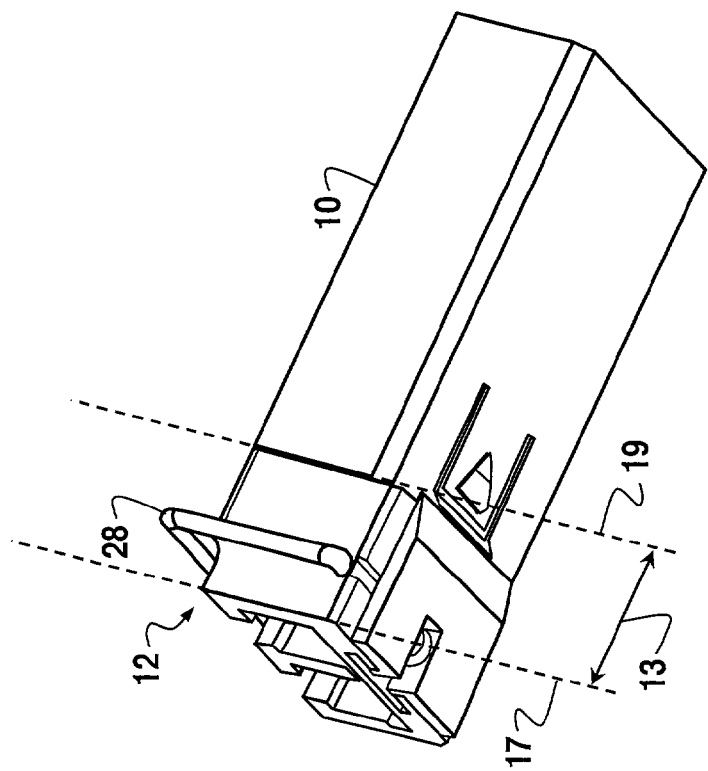
FIG. 1 depicts a perspective pictorial view of a pluggable module having a handle thereof in an upward position, in accordance with a preferred embodiment of the present invention.

FIG. 1 depicts a perspective view of a pluggable module 10 having a lever portion, which in an illustrated embodiment is formed as a handle 28 and is positioned in an upward position 12, in accordance with a preferred embodiment of the present invention. Pluggable module 10 can thus be generally configured to include a handle 28 with an associated cam 21 formed in a first section 13 of pluggable module 10. First section 13 is illustrated in FIGS. 1 and 2 between dashed lines 17 and 19. Handle 28 may be pulled in a downward direction to allow a substantially lateral or sliding movement of an associated ejector button 22 (i.e., illustrated in FIGS. 6 and 10) integrated with pluggable module 10 in order to release pluggable module 10 from the transceiver system cage 11. While other shapes and configurations could be used, as is shown in the illustrated embodiment, the ejector button 22 is configured with an end having a substantially tapered shape so as to have a wedge-like shape. As is discussed in further detail, this wedge shape provides a surface that allows the ejector button 22, when slidably/laterally moved to the positions shown in FIGS. 2, 8 and 10, to disengage the pluggable module 10 from the transceiver system case 11. Moreover, once disengaged, the module 10 can be removed from the case 11 via the handle 28; a pulling force applied to the handle 28 slidably removes the module from the case.

Pluggable module 10 may thus be removed from the transceiver system case 11 utilizing handle 28. Pluggable module 10 may be locked into the transceiver system when handle 28 is placed in an upward position 12, as illustrated in FIG. 1. Handle 28 may be configured from a wire handle, which can be formed from steel wire. The ejector button 22 (i.e., see FIGS. 6 and 10) may be configured from molded plastic. FIG. 2 illustrates a perspective view of pluggable module 10 having handle 28 thereof in a downward position 14, in accordance with a preferred embodiment of the present invention.

Figure 3:
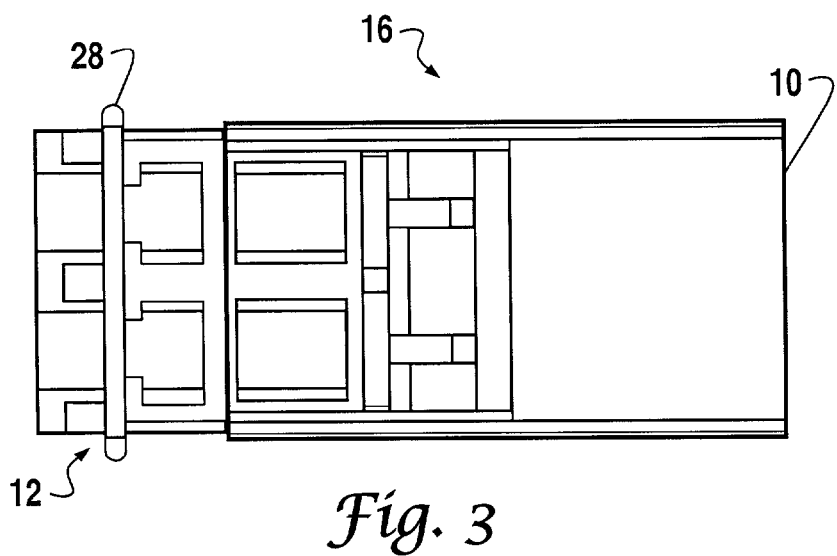
FIG. 3 depicts a top view of a pluggable module having a handle thereof in an upward position, in accordance with a preferred embodiment of the present invention.
Figure 4:
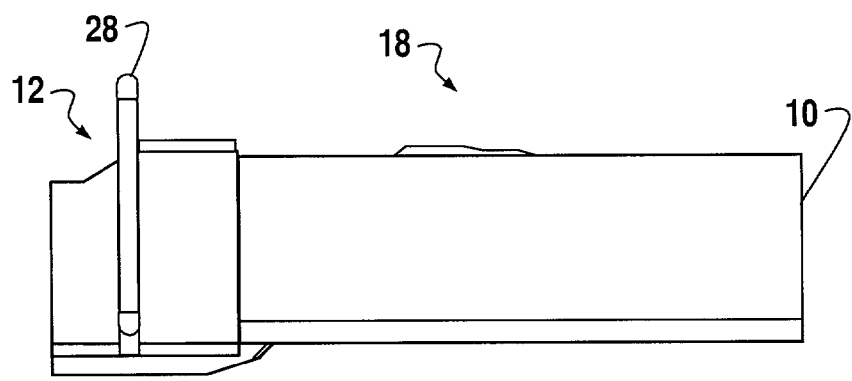
FIG. 4 illustrates a side view of a pluggable module having a handle thereof in an upward position, in accordance with a preferred embodiment of the present invention.
Figure 5:
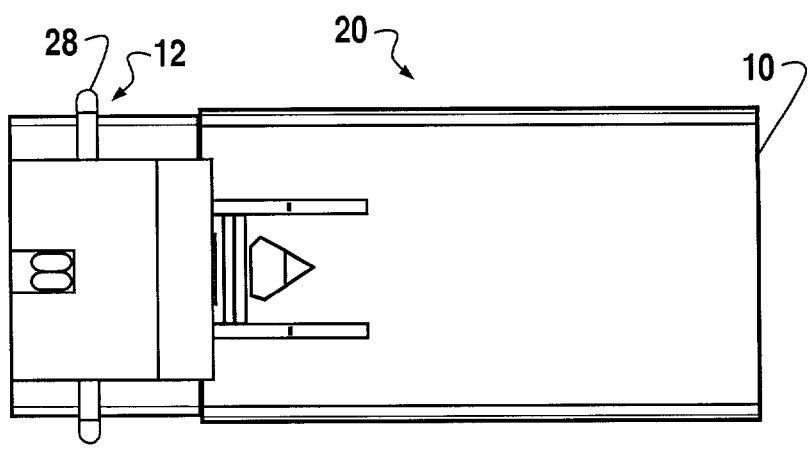
FIG. 5 depicts a bottom view of a pluggable module having a handle thereof in an upward position, in accordance with a preferred embodiment of the present invention.
Figure 6:
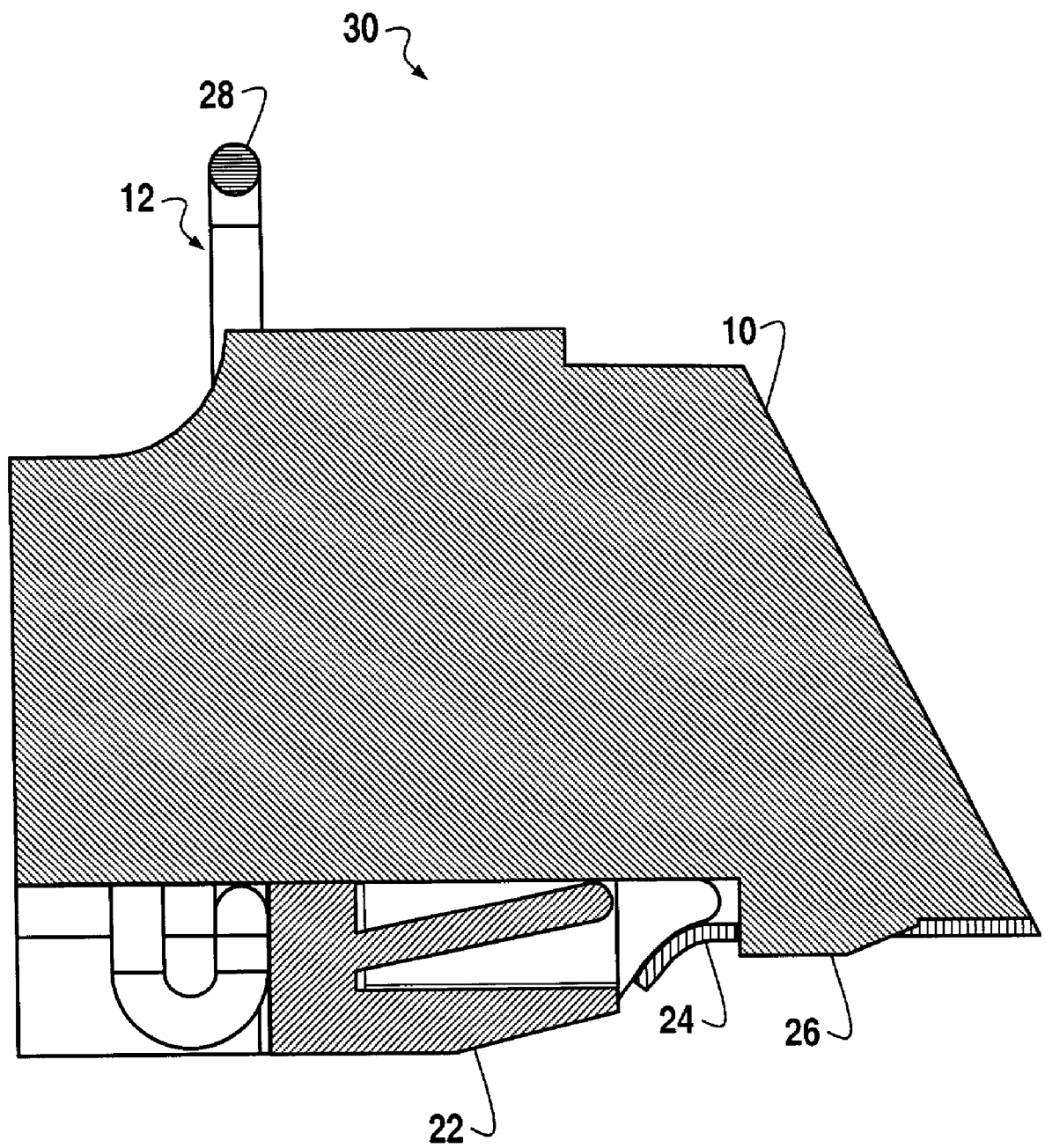
FIG. 6 illustrates a sectional view of a pluggable module having a handle thereof in an upward position, in accordance with a preferred embodiment of the present invention.

Note that in FIGS. 1 to 10, analogous or like parts are indicated by identical reference numerals. Thus, FIGS. 1 to 10 are jointly illustrated herein to provide varying views of pluggable module 10. FIG. 3 depicts a top view 16 of pluggable module 10 having handle 28 thereof in an upward position 12, in accordance with a preferred embodiment of the present invention. FIG. 4 illustrates a side view 18 of pluggable module 10 having handle 28 thereof in an upward position 12, in accordance with a preferred embodiment of the present invention. FIG. 5 depicts a bottom view 20 of pluggable module 10 having handle 28 thereof in an upward position 12, in accordance with a preferred embodiment of the present invention. FIG. 6 illustrates a sectional view 30 of pluggable module 10 having handle 28 thereof in an upward position 12, in accordance with a preferred embodiment of the present invention. Sectional view 30 of FIG. 6 additionally illustrates an ejector button 22, a locking tab 24 and recess 25 positioned on a cage 11 that receives the pluggable module 10 and its corresponding locking member or tab 26 disposed thereon.

Figure 7:
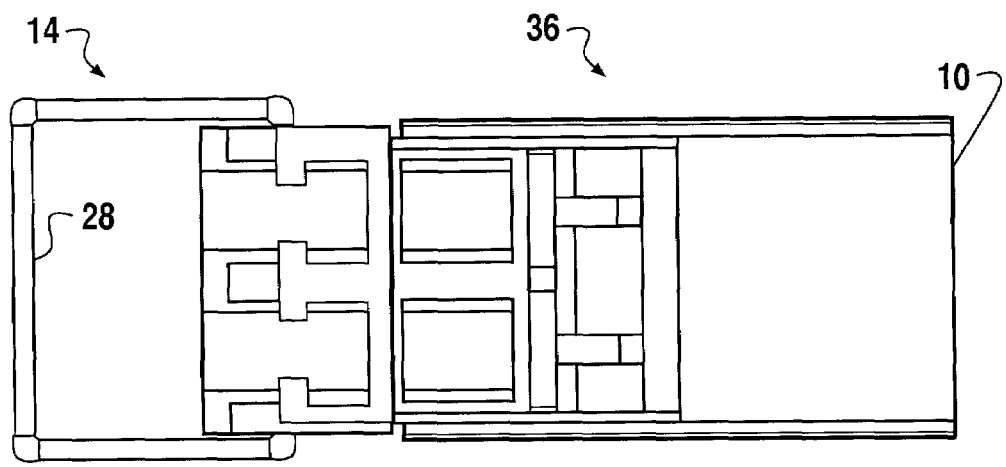
FIG. 7 depicts a top view of a pluggable module having a handle thereof in a downward position, in accordance with a preferred embodiment of the present invention.
Figure 8:
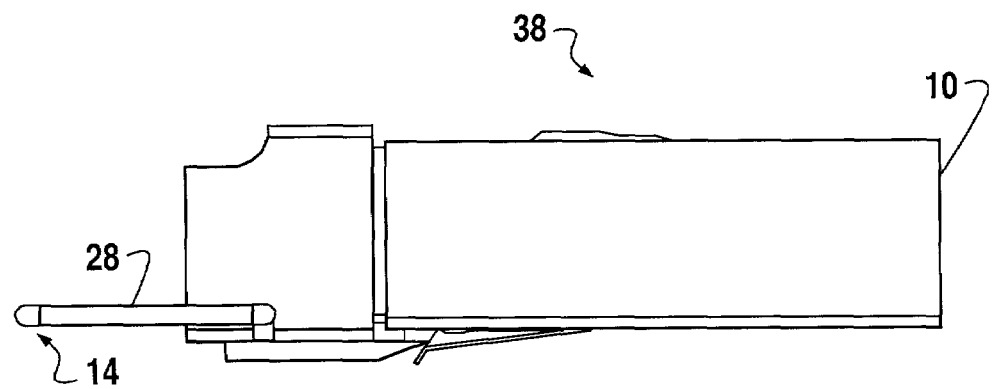
FIG. 8 illustrates a side view of a pluggable module having a handle thereof in a downward position, in accordance with a preferred embodiment of the present invention.
Figure 9:
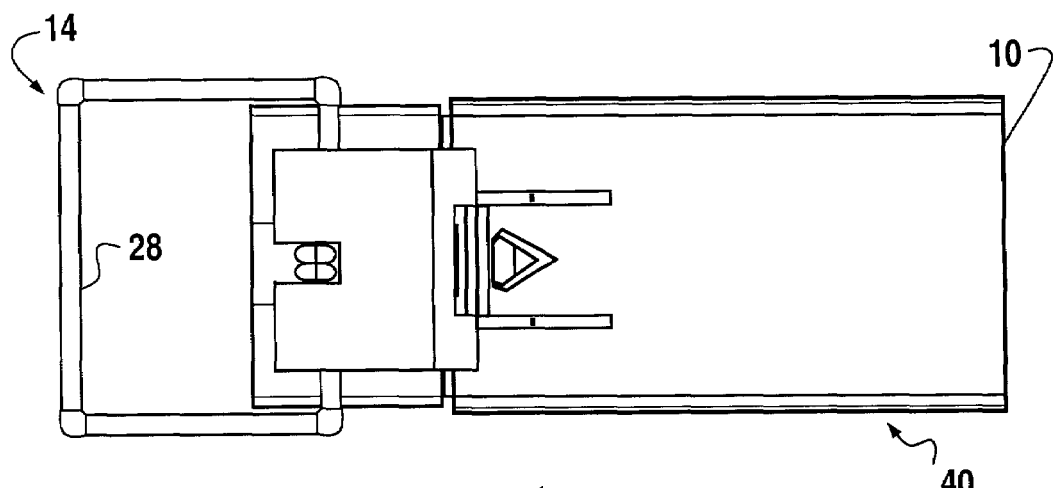
FIG. 9 depicts a bottom view of a pluggable module having a handle thereof in a downward position, in accordance with a preferred embodiment of the present invention.

FIG. 7 depicts a top view 36 of pluggable module 10 having a handle thereof in a downward position 14, in accordance with a preferred embodiment of the present invention. FIG. 8 illustrates a side view 38 of pluggable module 10 having handle 28 thereof in a downward position 14, in accordance with a preferred embodiment of the present invention. FIG. 9 depicts a bottom view 40 of pluggable module 10 having handle 28 thereof in a downward position 14, in accordance with a preferred embodiment of the present invention.

Figure 10:
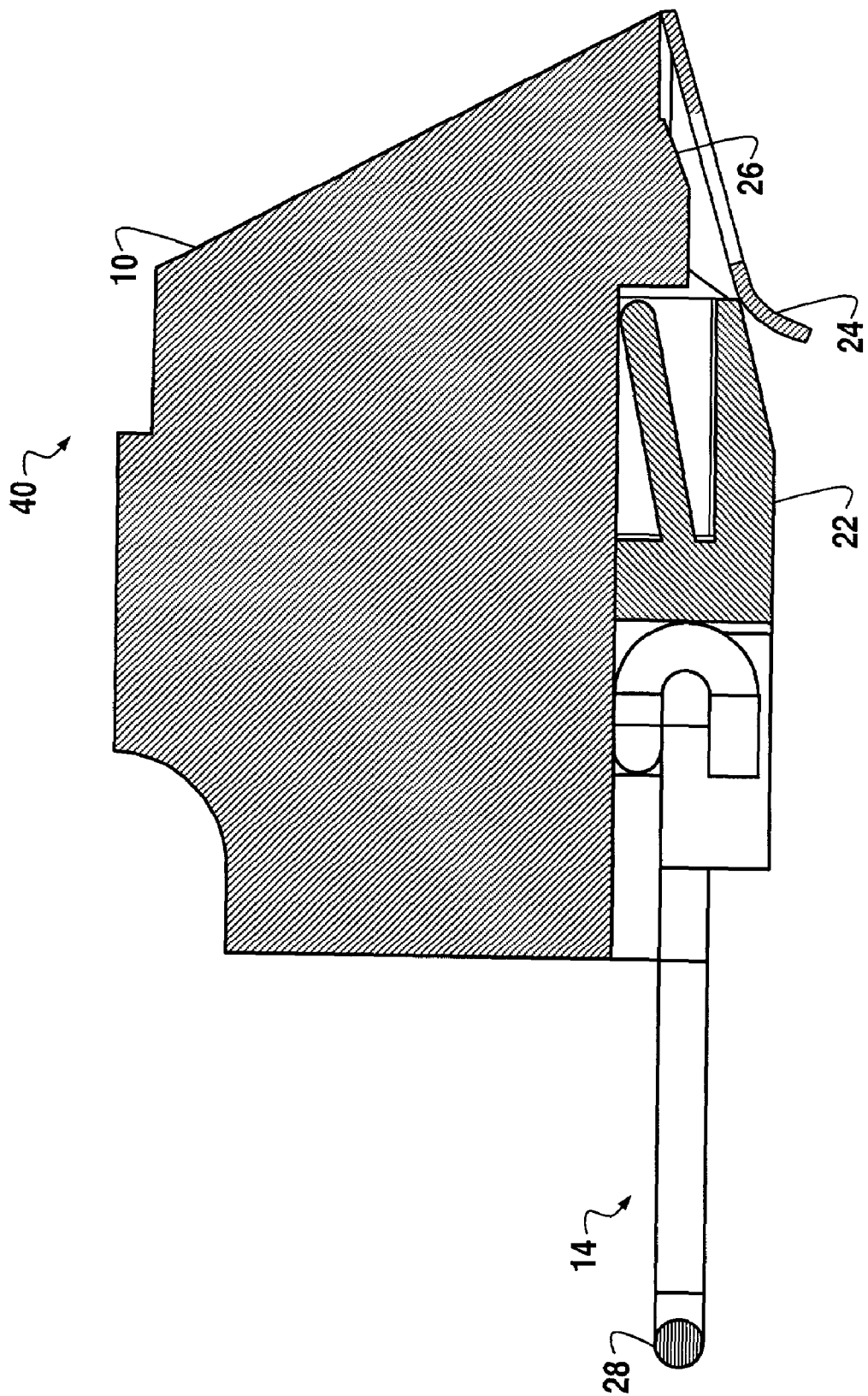
FIG. 10 illustrates a sectional view of a pluggable module having a handle thereof in a downward position, in accordance with a preferred embodiment of the present invention.
Figure 9:
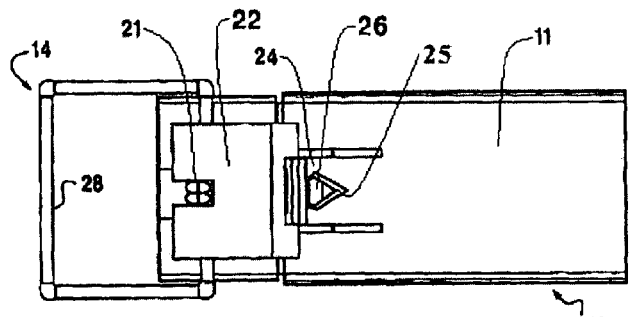
Figure 10:
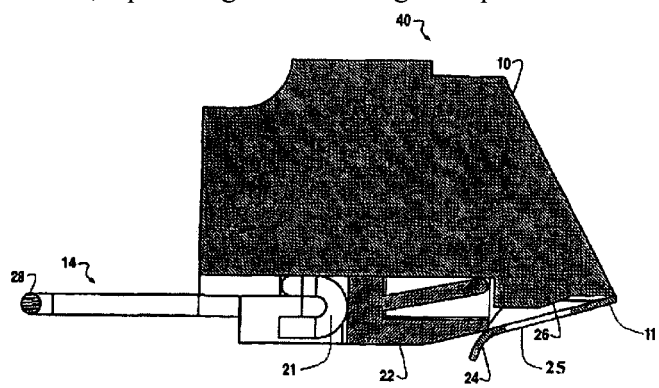

FIG. 10 illustrates a sectional view 40 of pluggable 10 module having handle 28 thereof in a downward position 14, in accordance with a preferred embodiment of the present invention. The method and system for removing a module, such as pluggable module 10, as indicated herein, thus utilizes a small wire handle 28 with a cam 21 formed in one section and a modified ejector button 22. When handle 28 is placed in an upward position 12 as indicated, for example, in FIG. 6 the module may be locked into place, by virtue of the locking member or tab 26 being disposed within the recess 25 of the locking tab 24 portion of the cage. When the handle is pulled down, the cam 21 moves the ejector button 22, which releases the module, as is shown in FIG. 10, by displacing the locking tab 24 portion of the cage, thereby disengaging the locking member or tab 26 portion of the module 10 from the recess 25. Handle 28 can then be utilized to pull the module away from the transceiver system cage 11 or other associated system into which it was previously plugged.

Pluggable module 10 can be configured as a transceiver module for use in a transceiver system or associated systems thereof. Such a transceiver module may be configured as an optoelectronic transceiver module, such as, for example, an infrared (IR) transceiver. Pluggable module 10 can include an emitter (not illustrated), which can be configured from a small laser.

Such a small laser may be, for example, a VCSEL (Vertical Cavity Surface Emitting Laser). A VCSEL is a type of laser device that emits light in a single direction through an upper structure of the laser structure. VCSEL devices thus generally combine the performance advantage of LEDs and lasers at costs comparable to LED solutions. Traditional semiconductor lasers, such as the ones utilized in CD players, emit light from edge of the chip, so it is necessary to cleave a wafer into chips and package the chip before knowing of the laser is good. VCSELs emit light vertically from the wafer surface, like LEDs, which means their fabrication and testing is fully compatible with standard integrated circuit procedures and equipment. VCSELs, however, are much faster and more efficient and produce a smaller divergence beam than LEDs. Pluggable module 10 can thus be configured as a transceiver module based on a VCSEL laser, which produces a beam, that projects light in a collimated fashion.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from scope of the following claims. It is contemplated that the use of the present invention can involve components having different characteristics. It is intended that the scope of the present invention be defined by the claims appended hereto, giving full cognizance to equivalents in all respects.

The invention claimed is:

1. A device comprising:
   a module including an ejector button; and
   a handle attached to said module, said handle including a cam portion in the shape of a bend, the cam portion being operably disposed with respect to the ejector button, and the handle being configured and arranged such that:
     rotary motion of the handle in a first direction corresponds with a linear motion of the ejector button to a first position where the module is engaged with a cage of an associated transceiver system; and
     rotary motion of the handle in a second direction corresponds with a linear motion of the ejector button to a second position where the module is disengaged from the cage of the associated transceiver system.

2. The device of claim 1, wherein said module is removable from said transceiver system utilizing said handle.

3. The device of claim 1, wherein said handle is formed from wire.

4. The device of claim 1, wherein said ejector button is configured from molded plastic.

5. The device of claim 1, wherein said module comprises a pluggable module.

6. The device of claim 1, wherein said module comprises a form-factor pluggable transceiver module for use in association with said transceiver system.

7. A pluggable module, comprising:
   a first section;
   a locking member configured to releasably engage corresponding structure of an associated transceiver system cage;
   an ejector button attached to the first section;
   a handle attached to the first section and operably disposed with respect to the ejector button such that:
     disposition of the handle in a first handle position corresponds with a first position of the ejector button where the corresponding structure of the cage is positioned such that the locking member is disengaged from the corresponding structure; and
     disposition of the handle in a second handle position corresponds with a second position of the ejector button where the corresponding structure of the cage is positioned such that the locking member is engaged with the corresponding structure.

8. The pluggable module as recited in claim 7, wherein the first handle position corresponds with a partial deflection of the corresponding structure of the cage.

9. The pluggable optoelectronic transceiver module as recited in claim 7, wherein the pluggable optoelectronic transceiver module substantially conforms with the Small Form-Factor Pluggable Transceiver Multisource Agreement.

10. The pluggable optoelectronic transceiver module as recited in claim 7, further comprising a sensor and receiver circuitry at least partially disposed within a housing.

11. The pluggable optoelectronic transceiver module as recited in claim 7, further comprising an emitter and transmitter circuitry at least partially disposed within a housing.

12. The pluggable optoelectronic transceiver module as recited in claim 11, wherein the emitter is a vertical cavity surface emitting laser.

13. The pluggable module as recited in claim 7, wherein the handle includes a cam portion operably disposed with respect to the ejector button such that a rotation of the handle corresponds with a linear movement of the ejector button.

14. The pluggable module as recited in claim 13, wherein the handle comprises wire and the cam portion comprises a portion of the handle having the shape of a bend.

15. The pluggable optoelectronic transceiver module as recited in claim 13, wherein the cam is at least partially disposed within an opening defined by the ejector button.

* * * * *

UNITED STATES PATENT AND TRADEMARK OFFICE
CERTIFICATE OF CORRECTION

PATENT NO. : 7,255,484 B2  Page 1 of 4
APPLICATION NO. : 10/006103
DATED : August 14, 2007
INVENTOR(S) : Walker, Jr. et al.

It is certified that error appears in the above-identified patent and that said Letters Patent is hereby corrected as shown below:

Drawings
Sheet 1, replace Fig. 1 with the figure depicted below.

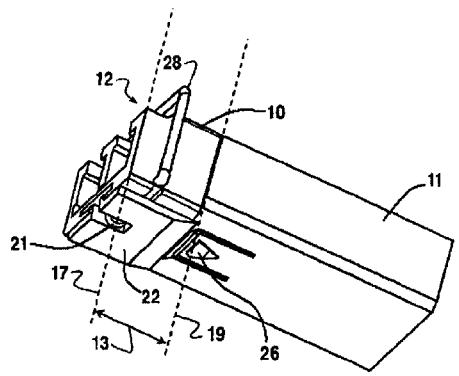

Fig. 1

Drawings
Sheet 1, replace Fig. 1 with the figure depicted below.

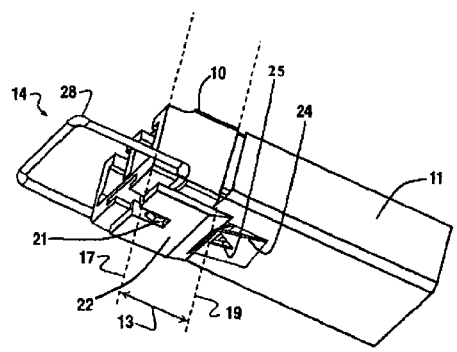

Fig. 2

Signed and Sealed this
Fourth Day of January, 2011

David J. Kappos
Director of the United States Patent and Trademark Office

CERTIFICATE OF CORRECTION (continued)
U.S. Pat. No. 7,255,484 B2

Drawings
Sheet 2, replace Fig. 2 with the figure depicted below.

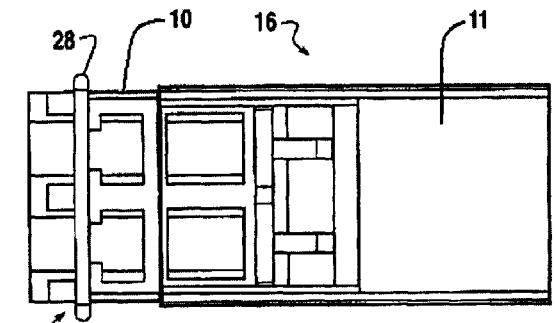

Fig. 3

Drawings
Sheet 2, replace Fig. 2 with the figure depicted below.

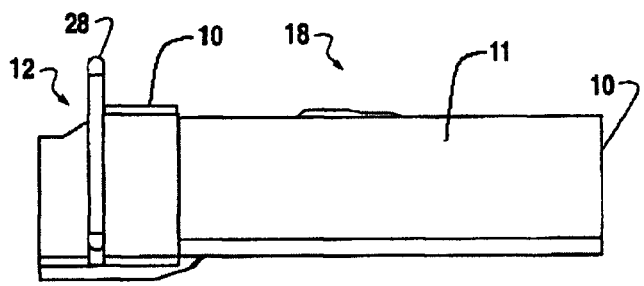

Fig. 4

Drawings
Sheet 2, replace Fig. 5 with the figure depicted below.

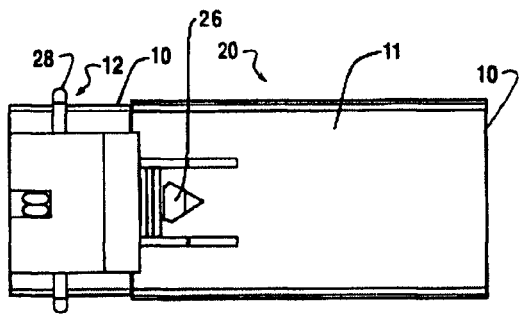

Fig. 5

CERTIFICATE OF CORRECTION (continued)
U.S. Pat. No. 7,255,484 B2

Drawings
Sheet 3, replace Fig. 6 with the figure depicted below.

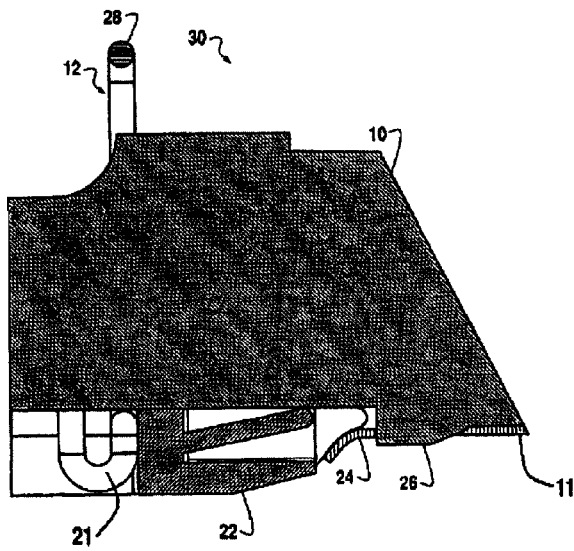

*Fig. 6*

Drawings
Sheet 4, replace Fig. 2 with the figure depicted below.

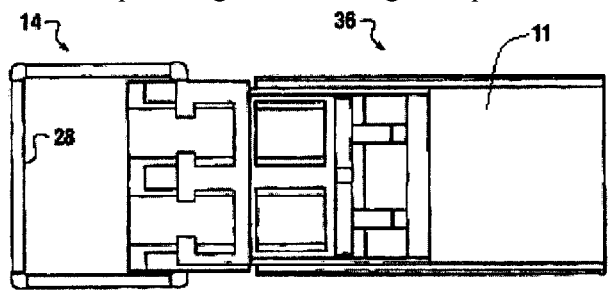

*Fig. 7*

Drawings
Sheet 4, replace Fig. 2 with the figure depicted below.

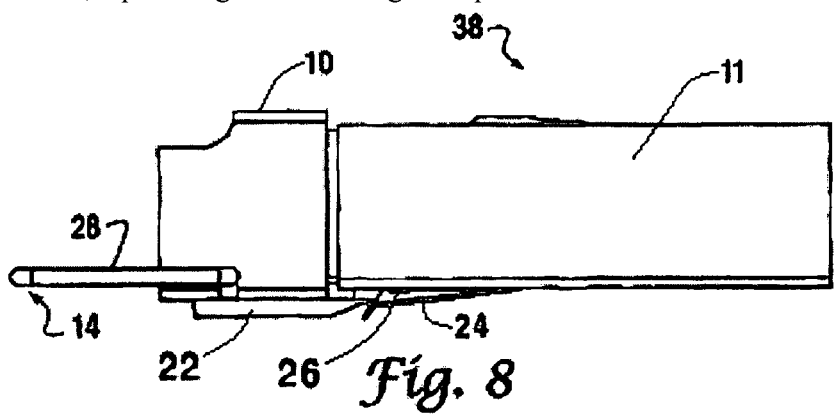

*Fig. 8*

Drawings
Sheet 4, replace Fig. 2 with the figure depicted below.

Drawings
Sheet 5, replace Fig. 2 with the figure depicted below.

Column 3
Line 64, change "case" to --cage--
Line 65, change "case" to --cage--

Column 4
Line 2, change "case" to --cage--